United States Patent
Betker et al.

[19]

[11] Patent Number: 5,889,981
[45] Date of Patent: *Mar. 30, 1999

[54] APPARATUS AND METHOD FOR DECODING INSTRUCTIONS MARKED WITH BREAKPOINT CODES TO SELECT BREAKPOINT ACTION FROM PLURALITY OF BREAKPOINT ACTIONS

[75] Inventors: Michael Richard Betker, Allentown; Shaun Patrick Whalen, Wescosville, both of Pa.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 646,158

[22] Filed: May 7, 1996

[51] Int. Cl.$^6$ ..................................................... G06F 9/355
[52] U.S. Cl. .................... 395/568; 395/591; 395/183.11; 395/183.1; 395/704
[58] Field of Search ........................... 395/183.1, 183.11, 395/591, 704, 568, 584

[56] References Cited

U.S. PATENT DOCUMENTS

| | | | |
|---|---|---|---|
| 4,635,193 | 1/1987 | Moyer et al. | 395/183.1 |
| 4,747,045 | 5/1988 | Harigai et al. | 395/591 |
| 5,249,278 | 9/1993 | Krauskopf | 395/413 |
| 5,321,828 | 6/1994 | Phillips et al. | 395/500 |
| 5,371,894 | 12/1994 | DiBrino | 395/800 |
| 5,479,652 | 12/1995 | Dreyer et al. | 395/183.06 |
| 5,533,192 | 7/1996 | Hawley et al. | 395/183.04 |
| 5,537,550 | 7/1996 | Kane et al. | 395/591 |
| 5,572,667 | 11/1996 | Ideta | 395/183.11 |
| 5,691,920 | 11/1997 | Levine et al. | 702/186 |
| 5,704,034 | 12/1997 | Circello | 395/183.14 |

OTHER PUBLICATIONS

DSP 1610 Information Manual, pp. 2–15, 1992 AT&T.
DSP 1610 Support Tools Manual For Release 3.4, pp. 6–9–12, 1994 AT&T.

Primary Examiner—Thomas C. Lee
Assistant Examiner—Gautam R. Patel

[57] ABSTRACT

The invention specifies on-chip address matching hardware which is external to the processor core and prefetch queue of a microcontroller, and instruction decoding logic to mark and process breakpointed instructions. The address matching hardware includes a number of equality comparators which observe addresses on an intermodule bus of the microcontroller. This bus is not directly connected to the processor core and handles both instruction and data traffic. In one embodiment, four such matchers are provided. When an instruction address matches one of the breakpoints, a code indicating the breakpoint number is returned along with the instruction fetched. This breakpoint code is entered into the prefetch queue in the processor core, along with the instruction. When that instruction reaches the decode stage, the breakpoint information is decoded along with the instruction. The breakpoint actions associated with an instruction only occur when the instruction is about to be issued for execution. The decode logic of the processor core uses additional signals from the external matching hardware to determine if the breakpoint number associated with the current instruction is enabled to cause a breakpoint event. If the instruction is enabled to cause an event, the decode logic causes the event to happen. Regardless, the decode logic signals the external matching logic that a breakpointed instruction has been detected. When a breakpoint event is not enabled, the external matching logic can take other action such as updating a counter or starting execution monitoring activities.

32 Claims, 4 Drawing Sheets

5,889,981

APPARATUS AND METHOD FOR DECODING INSTRUCTIONS MARKED WITH BREAKPOINT CODES TO SELECT BREAKPOINT ACTION FROM PLURALITY OF BREAKPOINT ACTIONS

FIELD OF THE INVENTION

The present invention relates generally to digital microprocessor devices, and more particularly to a scheme for improving the implementation of instruction breakpoints in such microprocessor devices.

BACKGROUND OF THE INVENTION

One of the possible debugging tools used by programmers and software engineers is the hardware instruction breakpoint capability found in many digital processors. As would be understood by a person skilled in the art, an instruction breakpoint occurs when an instruction which is about to be executed has been marked as a breakpointed instruction. Typically, the primary function of hardware instruction breakpoints in processors of the prior art is to permit a debugger (using other external hardware resources) to cause instruction execution to stop when a particular instruction is executed.

Traditional approaches to providing hardware breakpoints do not work correctly, however, when the processor incorporates a prefetch queue. When a microprocessor has a prefetch queue, the instruction addresses to be fetched which appear at the external interface of the chip or even at the external interface of the processor core are not necessarily executed. Even though an instruction is fetched, a preceding instruction in the queue may cause a transfer of execution before later instructions in the queue are executed. The problem then becomes one of matching against addresses as they are decoded for execution. These addresses, however, are generally not observable outside of the processor core. In addition, it is sometimes useful to have an instruction address match cause a trigger to a counter or some monitoring hardware, rather than only interrupt processor execution. This triggering capability is not found in prior art systems. The breakpoint problem is further compounded if multiple hardware breakpoints are provided. In this case, instructions which are breakpointed must be associated with a particular breakpoint.

One prior art attempt at addressing the problem of providing instruction breakpoints in a processor having a prefetch queue can be found in some Motorola background debug mode-equipped processors which includes a break pin. By including the break pin, these processors are capable of correctly handling some of the problems presented by the prefetch queue. However, these processors require external matching hardware and cannot handle multiple breakpoints or breakpoints of the trigger variety. Other attempts in the prior art at solving the above problem include processors which jam a break opcode into the prefetch queue. This methodology requires a wide multiplexer in the instruction fetch path, however, which is also undesirable.

Accordingly, there is a need for a more flexible mechanism to implement on-chip hardware instruction breakpoints which handles either break or trigger behavior on multiple breakpoints.

SUMMARY OF THE INVENTION

The invention specifies on-chip address matching hardware which is external to the processor core and prefetch queue of a microcontroller, and instruction decoding logic to mark and process breakpointed instructions. The address matching hardware includes a number of equality comparators which observe addresses on an intermodule bus of the microcontroller. This bus is not directly connected to the processor core and handles both instruction and data traffic. In one embodiment, four such matchers are provided. When an instruction address matches one of the breakpoints, a code indicating the breakpoint number is returned along with the instruction fetched. This breakpoint code is entered into the prefetch queue in the processor core, along with the instruction. When that instruction reaches the decode stage, the breakpoint information is decoded along with the instruction. The breakpoint actions associated with an instruction only occur when the instruction is about to be issued for execution. The decode logic of the processor core uses additional signals from the external matching hardware to determine if the breakpoint number associated with the current instruction is enabled to cause a breakpoint event. If the instruction is enabled to cause an event, the decode logic causes the event to happen. Regardless, the decode logic signals the external matching logic that a breakpointed instruction has been detected. When a breakpoint event is not enabled, the external matching logic can take other action such as updating a counter or starting execution monitoring activities.

BRIEF DESCRIPTION OF THE FIGURES

For a better understanding of the present invention, reference may be made to the following description of exemplary embodiments thereof, considered in conjunction with the accompanying drawings, in which.

DETAILED DESCRIPTION

Although the present invention is described with reference to a specific embodiment of a digital microprocessor, it would be understood that the instruction breakpoint mechanism of the present invention may be adapted for use with other digital processing devices having comparable hardware capabilities, including microprocessors, microcontrollers and digital signal processors. All such variations are intended to be included within the scope of the present invention.

Figure 1:
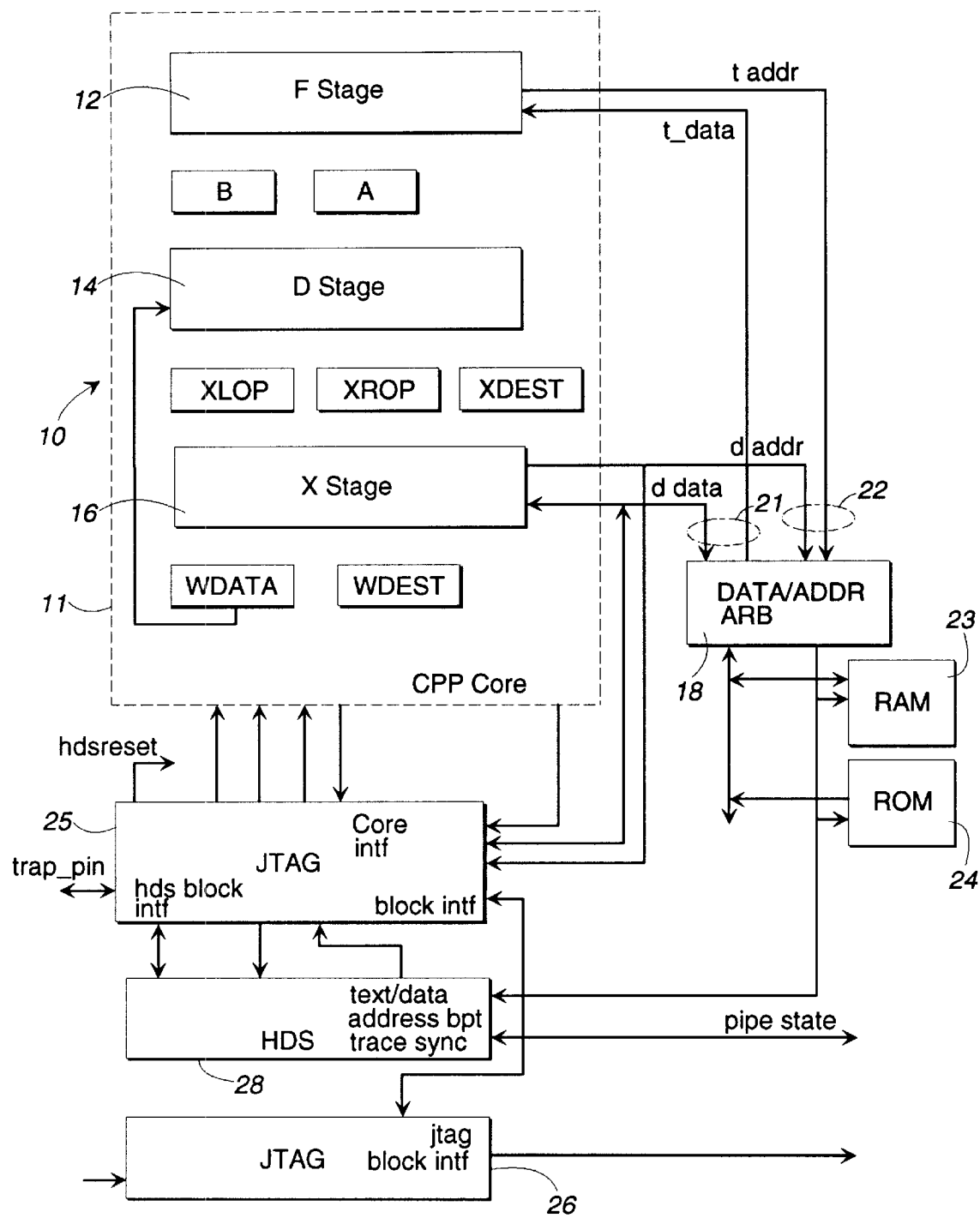
FIG. 1 shows one embodiment of a processor pipeline as described in accordance with the present invention.

Referring to FIG. 1, there is shown a generalized block diagram of a digital processor 10 implementable, for example, in an integrated circuit chip in accordance with the present invention. As shown, the microprocessor 10 includes a core section 11 which includes various pipeline stages and associated registers including, a fetch stage 12, decode stage 14, and execute stage 16. As would be understood by those skilled in the art, instructions to be executed on the processor are fetched or retrieved by means of hardware included in the fetch stage 12. The instructions are then decoded in the decode stage 14 and executed in an appropriate sequence in the execute stage 16. A prefetch queue is also included within the fetch stage 12 in order to decouple the fetching of instructions from their decode and execution. The processor further includes data and address bus arbitration means 18, which couple to the data and address buses 21, 22, respectively, of the core and which may take the form of a programmable chip select (PCS), for example. On-board memory components including RAM 23 and ROM 24 are coupled to the data and address buses 21,22 through the arbitration means 18. Also included in the shown embodiment are a Joint Test Action Group (JTAG) block 25 and a JTAG interface block 26 used in the performance of debug operations, as well as a hardware development system (HDS) block 28 which is controlled by the JTAG block 25.

It is well known that a primary function of hardware instruction breakpoints is to permit a debugger (using the hardware resources of the debug blocks external to the core) to cause instruction execution to stop when a particular instruction is about to be executed. An instruction breakpoint occurs when an instruction is decoded which has been marked as a breakpointed instruction. In accordance with the present invention, an instruction so marked may cause a debug event. Alternatively, a debug event may not occur, but some other action outside the core may take place. This function is provided through the cooperation of the core and the hardware development system (HDS) block.

Figure 2:
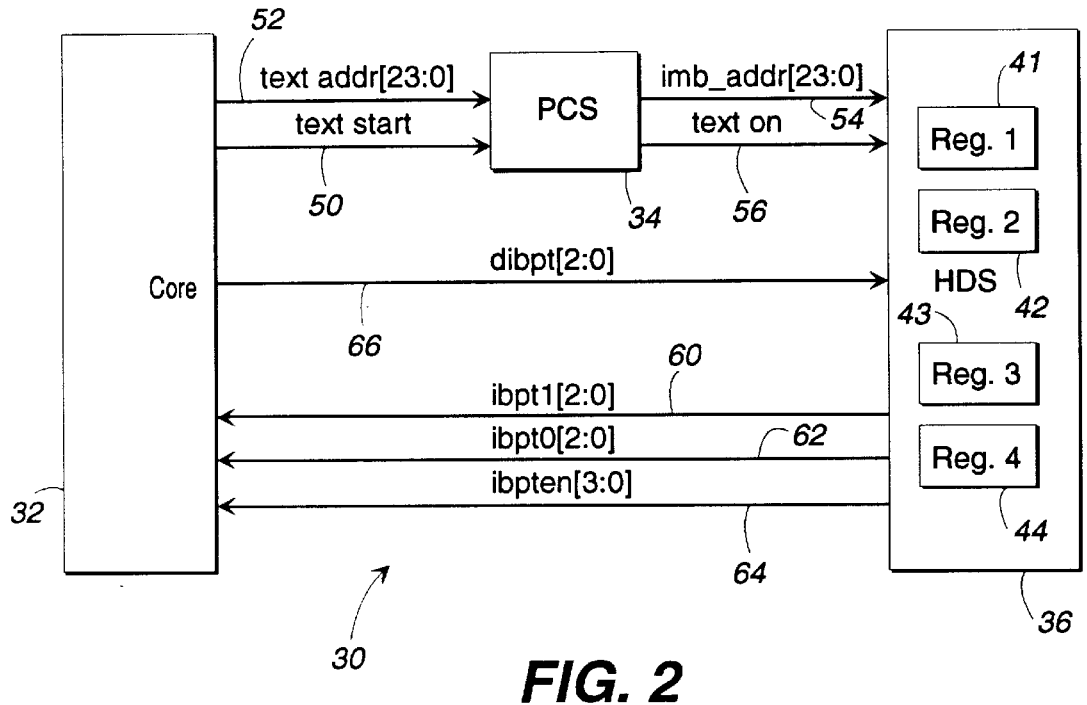
FIG. 2 shows one advantageous embodiment of a mechanism for implementing hardware breakpoints in accordance with the present invention.

Referring to FIG. 2, there is shown one exemplary embodiment of a mechanism 30 for implementing instruction breakpoints in accordance with the present invention. FIG. 2 shows a partial illustration of components included in the exemplary processor 10, which are necessary to implement the present invention instruction breakpoint scheme. As shown, the processor includes a processor core 32, a programmable chip select block 34 and an HDS block 36. As would be understood, the processor core would include the fetch, decode and execute stages shown in FIG. 1. In one advantageous embodiment of the present invention, the HDS block 36 is external to the core 32, but located on the same integrated circuit chip. The HDS 36 is controlled by a debugger executing on a host computer external to the chip (not shown) and communicating through the Joint Test Action Group (JTAG) port of the processor. As will be explained, in addition to stopping execution, the hardware instruction breakpoint mechanism 30 of the present invention can trigger a counter associated with the breakpoint to be updated, on-chip tracing to start and stop, or a pulse to appear on an external debug trap pin (shown in FIG. 1). The information indicating the breakpoint action is held in registers associated with each breakpoint address in the HDS block 36.

The HDS block 36 shown in FIG. 2 includes address matching logic for the instruction breakpoints. In the exemplary embodiment, the HDS block includes four 24-bit matching registers, 41–44 implemented, for example, using registers and/or comparators, and which examine the text address stream produced by the core 32. The HDS block is connected to a bus on which text addresses appear on the path to memory. The HDS block 36, however, is not connected directly to the address buses of the core 32 and does not require a dedicated address bus from the core. Whenever the address currently being fetched matches one of the four addresses in the matching registers 41–44 in the HDS, the HDS asserts signals which mark the corresponding instruction as having an associated breakpoint. This marker information is collected by the fetch stage found within the core 32 along with the instruction data returned from the memory.

The fetch stage receives the marker information and instruction data and loads these into its prefetch queue. As the fetch stage issues instructions to the decode stage for execution, the other instructions and breakpoint marks advance through the prefetch queue. Eventually, the decode stage in the core 32 receives an instruction and associated breakpoint marker from the fetch stage. The breakpoint marker information indicates which of the four breakpoints, if any, matched the address of this instruction. To indicate the disposition of this breakpoint, the decode stage receives additional information directly from the HDS block 36. This information tells the decode stage whether to generate a debug event instead of decoding the instruction in the normal manner. If a debug event is indicated, then the decode stage converts the instruction into a system breakpoint (sbpt) instruction. By transforming the instruction into a sbpt instruction, all instructions issued prior to the breakpoint instruction complete and instructions issued after the breakpointed instruction do not complete. In this case, the normal processing for the instruction is not performed. Instead, a debug event is taken which will permit the remote debugger to see that execution has stopped at a point just before this instruction has executed. If the signaling from the HDS block 36 does not indicate a debug event, the decode stage processes the instruction in the normal manner. In either case, the decode stage outputs the signals to the HDS block to indicate that an instruction with an associated breakpoint is to be executed. This information includes which breakpoint was set on the instruction.

In accordance with the present invention, the HDS block 36 uses the information that the decode stage decoded an instruction on which a breakpoint was set to optionally decrement a counter associated with the specific breakpoint register, start on-chip tracing, stop on-chip tracing, or assert the external debug trap pin. Since the information from the core 32 will include which breakpoint fired, the HDS block 36 can maintain separate counters for each of the four breakpoints. Furthermore, as would be understood, on-chip tracing can start with one breakpoint and end it with another. This gives the remote debugger user greater flexibility in tracking down problems than was available in prior art systems.

Implementation of the above-described functional behavior requires signaling and timing between the core 32 and the HDS block 36 to label text fetches and indicate breakpoint behavior, as will be explained. When the core 32 initiates a text fetch, it asserts a text_start signal 50 as shown in FIG. 2 and then furnishes the address of the text fetch on its text_addr bus 52. The PCS block 34 arbitrates the text fetch request among other potential users of an intermodule bus (imb) 54 and grants the text fetch to the core 32 by asserting the text_on signal 56 and copying the text_addr of the core to the imb_addr. As would be understood, since the exemplary embodiment of the processor has the capability to handle both 16-bit and 32-bit instructions, the fetch may be either a full word (4 bytes) or half-word (2 bytes), where instructions are aligned on half-word boundaries. The size of the fetch is indicated by the address, where a half word fetch is one in which bits [1:0] are 10 and a full word fetch is one in which bits [1:0] are 00.

Figure 3:
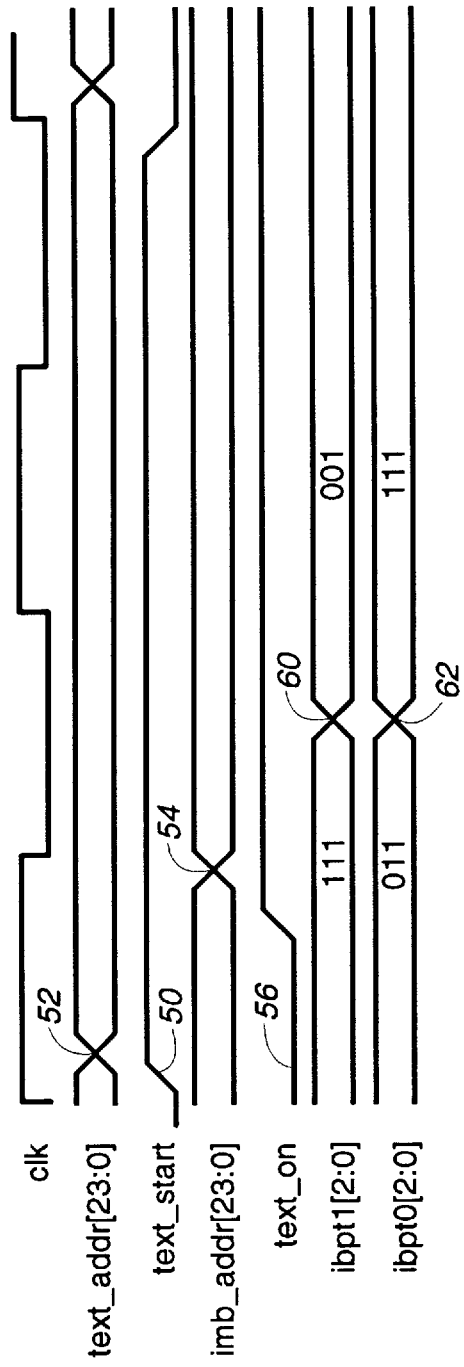
FIG. 3 shows an exemplary timing diagram for signals of the present invention breakpoint mechanism as they appear when fetching a breakpointed instruction.

As shown in FIG. 2, the HDS block 36 is one of the receivers on the imb_addr bus 54. The HDS block by means of its internal hardware is continually comparing the value on imb_addr 54 against the values of its four matcher registers 41–44. Since text addresses are always half or full word aligned, the bit [0]s of the matcher register and imb_addr may be ignored. Furthermore if the fetch is to a full word address, then bit [1] of the matcher is ignored since the four bytes being fetched include the two bytes being referenced by the address in the matcher register. The output of this address match is further qualified with the text_on signal, bit [1] of the imb_addr and bit [1] of the matcher address register. If the text_on signal 56 is asserted and an address match is detected and both bit [1] of the imb_addr and bit[1] of the matcher address register are asserted, i.e., equal to one, then the number of the matching breakpoint is driven on ibpt1 60 to the core 32. If text_on is asserted and an address match is detected and bit[1] of the imb_addr is not asserted, but bit [1] of the matcher address register is asserted, then the number of the matching breakpoint is also driven on ibpt1. In other words, if there is an address match on a text fetch to a half word aligned address or if there is a text fetch to a full word aligned address which contains the half word specified by the matcher address, then ibpt1 signals the number of that breakpoint. For ibpt0 62, if text_on is asserted and an address match is detected and both bit [1] of imb_addr and bit [1] of the matcher address register are 0, then the number of the matching breakpoint is driven on ibpt0. In other words, either a half word or full word fetch to a full word aligned address which matches a full word aligned matcher address will result in ibpt0 signaling the number of that breakpoint. As can be seen, both the ibpt0 and ibpt1 signals 60, 62 are necessarily input to the core 32 in order to account for all cases of a match during either a full word or half word fetch. For each of these cases, breakpoints 0 through 3 result in binary values of 000 through 011 placed on these signals. If no text fetch address match is detected, then a binary value of 111 is placed on these signals. FIG. 3 illustrates an exemplary timing diagram for the signals referenced above during a two-cycle text fetch.

The core 32 captures the values on the ibpt1 and ibpt0 signals 60, 62 in the prefetch queue. The fetch stage manages the prefetch queue and passes the breakpoint information, along with the instruction through the queue until it is issued to the decode stage. When the decode stage decodes the instruction, it observes the values on the instruction breakpoint enable (ibpten) [3:0] signals 64. Each bit of this signal represents one of the four hardware breakpoints. If a bit is asserted, then the corresponding breakpoint is enabled to cause a debug event. If the bit is not asserted, then that breakpoint will not cause a debug event, but may cause other action within the HDS block. The decode stage drives the breakpoint number of the instruction about to be executed on the dibpt [2:0] signal 66 to the HDS block where it is used in the next cycle to either decrement the counter associated with the breakpoint, assert a signal which starts on-chip trace collection, assert a signal to stop on-chip trace collection, or pulse the external debug trap pin.

Figure 4:
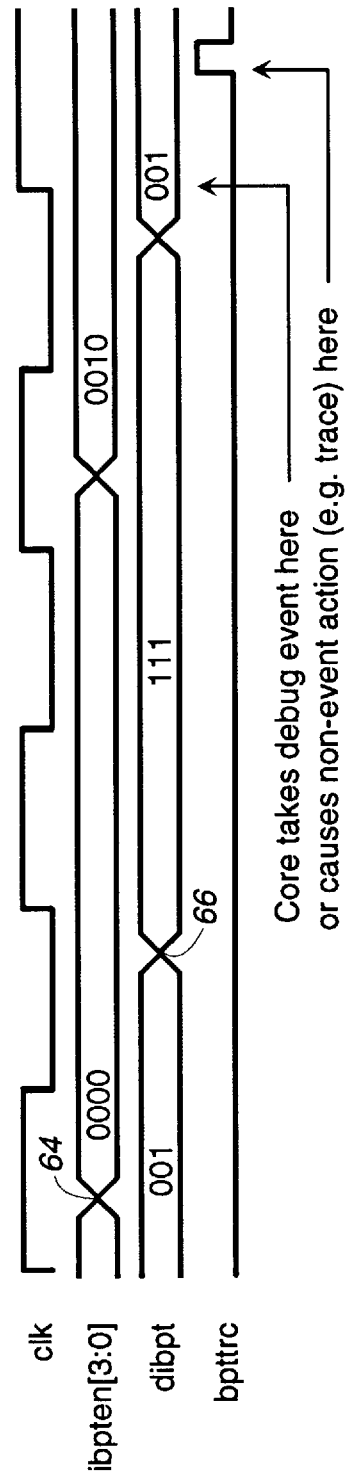
FIG. 4 shows a second exemplary timing diagram for additional signals of the present invention breakpoint mechanism as they appear when executing a breakpointed instruction.

FIG. 4 shows an exemplary timing diagram for the timing of the ibpten and dibpt signals 64,66. In this example, the core decodes an instruction which has hardware breakpoint 1 associated with it in a first cycle. The core asserts dibpt with a value of 001 to indicate this. However, since ibpten indicates (through a value of 0000) that no breakpoints are enabled to fire, the core does not take a debug event at this time. In the third cycle, the core again executes the instruction on which the hardware breakpoint 1 is set. This time, however, breakpoint 1 is enabled (as indicated by an ibpten value of 0010). Thus the core takes a debug event while asserting that breakpoint 1 was detected on dibpt.

Figure 5:
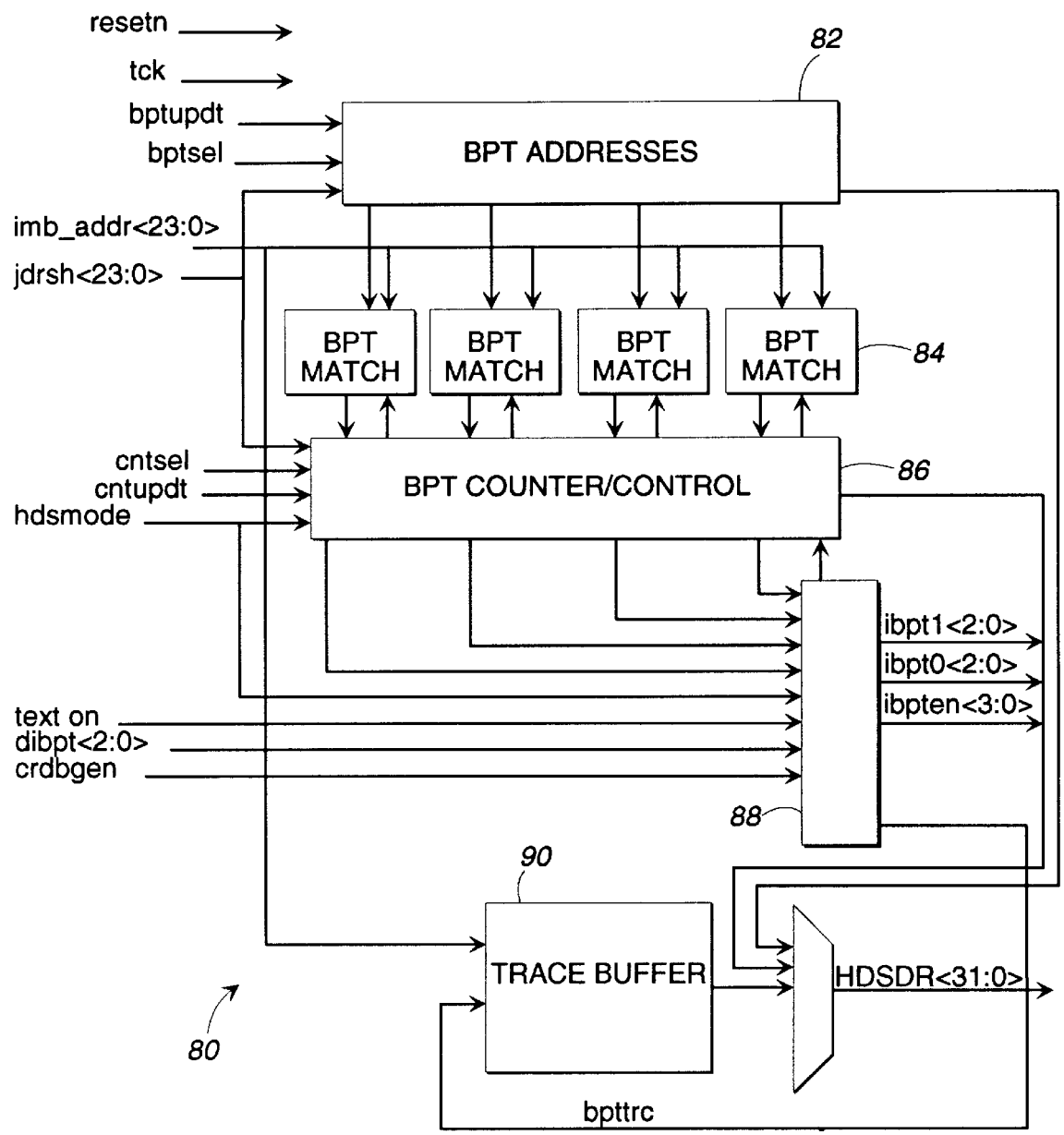
FIG. 5 shows an exemplary embodiment of an HDS block for implementing the present invention breakpoint mechanism in accordance with one embodiment of a processor.

Referring to FIG. 5, there is shown a more detailed illustration of exemplary hardware included within an HDS block 80 implemented in accordance with the present invention. As shown the HDS block includes a series of breakpoint address registers 82 which couple to breakpoint matching logic 84. The breakpoint matching logic 84 is coupled to a breakpoint counter/control block 86 which in turn couples to a breakpoint detector 88. A trace buffer section 90 is also included in the HDS block for control and operation of a discontinuity trace buffer. The HDS block 80 provides emulation capabilities for stand-alone debugging. Standalone debugging is defined as debugging without a bondout version of the chip and without the connection of a logic analyzer or memory emulator to the target system. The only connection is to the 4-pin JTAG port (shown in FIG. 1). As mentioned, the HDS block includes four hardware address breakpoints and a discontinuity trace buffer. The four breakpoints can be programmed as either text or data address breakpoints. In addition, each breakpoint can generate an HDS event to the core after one or up to 256 address matches. The text address breakpoints only generate an HDS event if the corresponding instruction is actually executed. As discussed, the HDS block also includes a discontinuity trace buffer 90. This trace buffer collects addresses to record program discontinuities such as jumps or calls.

The breakpoint address register block 82 holds the logic to implement the breakpoint address registers. In the exemplary embodiment, there are four 24-bit breakpoint address registers. These registers determine the address to be matched with the address on the intermodule bus. The inputs to this block include an input from ajdr (JTAG data register) shift register (jdrsh), a breakpoint address update signal (bptupdt) and a 2-bit signal indicating the current breakpoint number. The outputs of this block are one 24-bit value for each address register in the block and a parallel output of the register currently selected by the breakpoint queue pointer. When the bptupdt signal is asserted, then data on the jdrsh bus is loaded into the address register indicated by the 2-bit current breakpoint.

A plurality of breakpoint match blocks 84 are coupled to the breakpoint address block. These match blocks 84 implement the matching between an address on the inter-module bus 92 and the address in a breakpoint address register. In the shown embodiment, there are four breakpoint match blocks. The inputs to each match block 84 are the 24-bit address bus of the inter-module bus, and a type field for each of the four breakpoint control registers. Each block outputs a text match (tmatch) signal indicating if that breakpoint address had a match on the imb_addr bus for text breakpoints.

In the shown embodiment, each match block 84 functions by exclusive oring the 24-bit breakpoint address with the 24-bit intermodule bus address. If the result of this exclusive oring is all zeroes, then a match is detected. Text addresses match on the upper 22 bits for a half-word access and the upper 21 bits for full word access, as has been explained. If the intermodule bus address matches an address in one of the breakpoint registers, the corresponding tmatch output is asserted.

The breakpoint counter/control block 86 holds the logic to implement the breakpoint control registers and counters. The inputs to this block are the jdr shift register (jdrsh), the breakpoint control/count update signal (cntupdt), and the decrement signals from the breakpoint detect block. The outputs of this block are the parallel output of the counter/control register currently selected by the breakpoint queue pointer, a breakpoint type and breakpoint action fields of the four breakpoint control registers. Also included are four signals indicating that the corresponding counter has a count of zero, and four signals indicating that the corresponding counter has a count of one. Table 1 shows the definition of the bits in the counter register for the shown embodiment. The breakpoint/counter control block 86 also contains the breakpoint queue pointer. This pointer indicates the breakpoint address or counter/control register read and written by scans of the JTAG. In the shown embodiment, this pointer is a 2-bit modulo four counter which is cleared by a JTAG reset.

The breakpoint detect block 88 generates the signals which cause a text or data breakpoint to occur. In addition, this block generates the signals which begin or end tracing in response to a text trigger (a trigger is a text address and count match which does not generate a breakpoint). The inputs of this block are the intermodule bus signals, some control signals which determine when breakpoints are enabled, the core signals which indicate that the core is executing a breakpointed instruction (dibpt), and the breakpoint control register bits (tcbptact[0–3], tcbpttyp[0–3 1]). Also included are signals indicating the counters are at zero or one (cnt[0–3]is 0, cnt[0–3]is1) and the text match signal from the breakpoint matching section. The outputs of this block are the decrement signals to the counters (decr[0–3]), the signals to begin and end trace collection to the TRC-CTRL (bgntrc[0–3], endtrc[0–3]), the breakpoint enable signals to the core (ibpten), the breakpoint marker signals to the core for text breakpoints (ibpt1, ibpt0).

The breakpoint detect block 88 implements the logic which determines when a text breakpoint occurs. For text breakpoints, when a text access on the intermodule bus matches an address in one of the breakpoint address registers and the corresponding counter is at zero or one, the ibpt1 or ibpt0 signals are asserted to mark the current text fetch with the number of the matching breakpoint. This information is passed through the fetch queue in the core. When the instruction so marked is actually executed, the core informs this block by sending that breakpoint number on the dibpt signal. This block uses this signal to optionally decrement the corresponding counter. If the counter is at a value of zero or one, this block asserts the ibpten signals which informs the core which breakpoints have text addresses which are enabled to fire. If the core decodes an instruction whose breakpoint marker matches a bit of ibpten, the core will take a debug event instead of executing the instruction.

The HDS block 80 also includes a discontinuity trace buffer section 90 which receives inputs from the imb-addr and the breakpoint detect logic 88. As shown, the trace buffer is adapted to begin or end a trace based on the occurrence of a breakpoint. The trace buffer 90 provides a trace of instruction addresses which can be scanned out of TDO pin of the JTAG port. The trace buffer begins collecting a trace on an instruction address breakpoint which has been programmed with the start tracing action. The trace buffer collects trace information until an ending condition for a trace occurs, e.g., a breakpoint programmed to end a trace.

Figure 6:
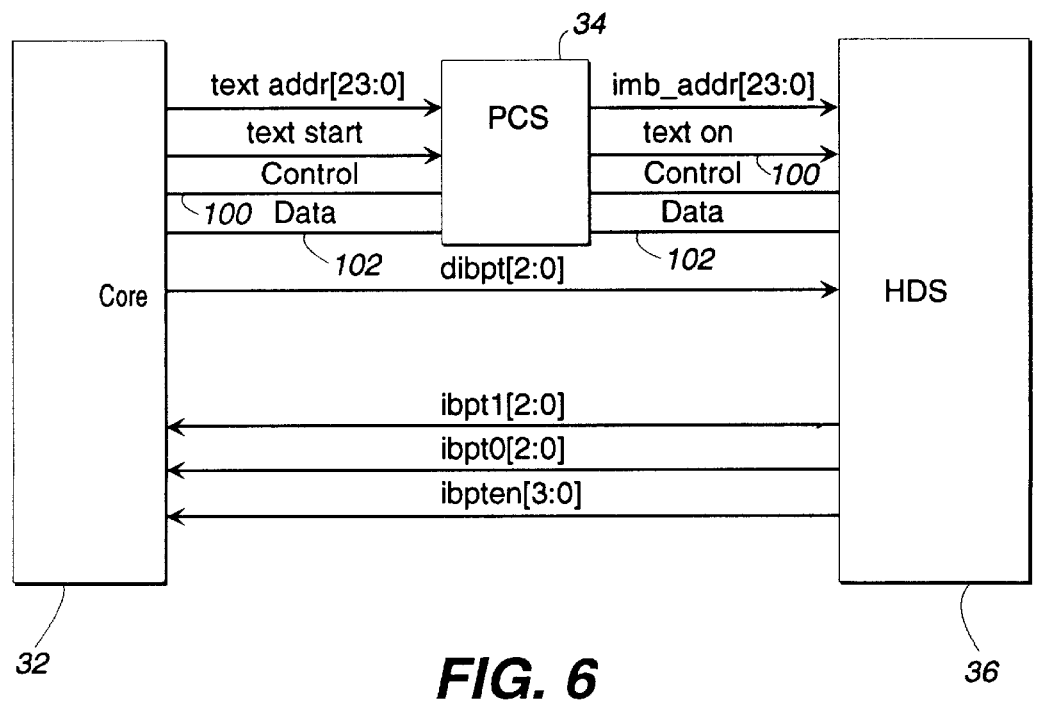
FIG. 6 shows a second advantageous embodiment of a mechanism for implementing hardware breakpoints in accordance with the present invention.

The current architecture and implementation can be extended to support more breakpoints and greater functionality. Although only four hardware breakpoints are shown in connection with the exemplary embodiment, the signaling can support up to seven breakpoints with essentially no change to the shown control. Support for more than seven breakpoints is also possible, but with changes to the HDS control to enable tracking breakpoints as they enter the prefetch queue and as they exit the decode stage. This is possible since other information is provided by the core to indicate when instructions which flush the prefetch queue are executed. Currently, the hardware breakpoints label instructions without regard to their conditional status. In other words, a breakpoint on a conditionally executed instruction always causes a debug event. As would be understood by a person skilled in the art, it may be useful to restrict debug events on conditional instructions to only those for which the conditional evaluation is true. The shown architecture could be readily extended to support this capability, as would be understood by a person skilled in the art. It would also be understood to a person skilled in the art that the address match could be extended to include arbitrary patterns or conditions such as partial addresses or address ranges. Additionally, matching according to the present invention scheme could be performed on control or data bits 100, 102, respectively, as illustrated in FIG. 6. Control conditions to be matched may include execution level, virtual/physical memory, kernel commands, etc., as would be understood.

As can be seen, the present invention requires no dedicated address output from the processor core. Thus, the difficulties presented by the prefetch queue are solved without requiring direct observation of the address of the instruction being decoded. The breakpoint information passed along through the prefetch queue supports multiple hardware breakpoints and the option of trigger behavior instead of break events. The breakpoint/trigger detection does not impair the execution speed of the chip. In addition, the present invention breakpoint mechanism requires no opcode jamming which would slow down the instruction fetch path. The breakpoint information modifies the instruction being decoded so that it appears to the rest of the execution control as a valid system breakpoint instruction. Thus, special event logic is not required to detect the breakpoint event. As mentioned, the present invention can be extended to make the hardware breakpoints conditional if an instruction was conditionally executed.

From the above, it should be understood that the embodiments described, in regard to the drawings, are merely exemplary and that a person skilled in the art may make variations and modifications to the shown embodiments without departing from the spirit and scope of the invention. For instance, although the address/condition matching logic and other related functional logic of the present invention are described in terms of an HDS block, it would be understood that such logic may be embodied within a generalized logic condition detection (LCD) block or a matching detection (MD) block. Accordingly, such logic may be applied in situations where detection of certain logic conditions is desirable during operation of a digital processor. All such variations and modifications are intended to be included within the scope of the invention as defined in the appended claims.

What is claimed is:

1. An integrated circuit including a digital processor adapted to decode and execute instructions marked with breakpoint codes, said integrated circuit comprising:

a processor core for processing instructions input to said processor, said processor core including a fetch circuit and a decode circuit, said fetch circuit including a prefetch queue;

a matching detection (MD) block coupled to said processor core, and being further coupled to an address bus of said digital processor, said MD block including:

at least one breakpoint register for storing a breakpoint condition to be matched on said address bus, said breakpoint condition indicating a breakpoint action from one of a plurality of breakpoint actions;

said MD block operable to return a breakpoint code indicative of a breakpoint number of said at least one breakpoint register to said fetch circuit when an address on said address bus matches said breakpoint condition;

said breakpoint code marking an instruction associated with said address on said address bus, wherein said instruction and said breakpoint code are decoded when said instruction reaches said decode circuit; and wherein said processor core is operable to provide a signal to said MD block when an instruction marked with said breakpoint code is to be decoded, said signal indicative of which of said at least one breakpoint register holds said breakpoint condition associated with the breakpoint code marking said instruction.

2. The integrated circuit of claim 1, wherein said MD block is further operable to provide a breakpoint enable signal to said processor core, said breakpoint enable signal indicative of whether a break event is enabled for said instruction marked with said breakpoint code to be executed.

3. The integrated circuit of claim 1, wherein said MD block further includes breakpoint matching means coupled to said at least one register for matching said breakpoint condition to said value on said address a bus.

4. The integrated circuit of claim 3, wherein said breakpoint matching means includes logic adapted to exclusive-OR said breakpoint condition stored in said at least one breakpoint register with said value on said address/data bus.

5. The integrated circuit of claim 4, wherein said breakpoint condition to be matched is selected from the group consisting of address, subset of address and address range.

6. The integrated circuit of claim 2, wherein said MD block is adapted to generate trigger events upon decoding of a breakpoint instruction.

7. The integrated circuit of claim 6, wherein said MD block further includes at least one breakpoint counter corresponding to said at least one breakpoint register, wherein said at least one breakpoint counter is updated upon occurrence of one of said trigger events.

8. The integrated circuit of claim 6, wherein said MD block further includes an on-chip trace buffer, said trace buffer being adapted to begin or end a trace based on occurrence of one of said trigger events.

9. The integrated circuit of claim 6, wherein said MD block is coupled to an external trap pin, said MD being adapted to pulse said external trap upon occurrence of one of said trigger events.

10. The integrated circuit of claim 1, wherein said MD block couples to said address bus through a single intermodule bus, further including a programmable chip select coupled to said address bus and said intermodule bus for granting access to devices coupled to said intermodule bus.

11. The integrated circuit of claim 1, further including a data bus coupled to said processor core and said MD block, said MD block being further operable to match a data value on said data bus with said breakpoint condition stored in said at least one breakpoint register.

12. The integrated circuit of claim 1, further including a control bus coupled to said processor core and said MD block, said MD block being further operable to match a value on said control bus with said breakpoint condition stored in said at least one breakpoint register.

13. The integrated circuit of claim 1, wherein said processor core is adapted to accomplish a fetch of a given size having one or more uniquely addressable instructions included therein, each of said uniquely addressable instructions being enabled to match one or more breakpoint conditions stored in said at least one breakpoint register.

14. The integrated circuit of claim 1, wherein said processor core is adapted to process 32-bit instructions and 16-bit instructions, said MD block being further adapted to match either 32-bit (full word) or 16-bit (half-word) instructions, said full word and half-word instructions being either full word or half-word aligned.

15. The integrated circuit of claim 14, wherein said breakpoint code includes a first and second breakpoint code signal generated from said MD block, said first breakpoint code signal being generated at either time when a match occurs on a fetch to a half word aligned address, and a fetch to a full word aligned address contains a half word specified by a matcher address; and said second breakpoint code signal being generated at either time when a half word fetch to a full word aligned address matches a full word aligned matcher address and when a full word fetch to a full word aligned address matches a full word aligned matcher address.

16. The integrated circuit of claim 6, wherein said at least one breakpoint register includes a corresponding breakpoint control register including selected fields for designating a specific action, type and count code, wherein said action code indicates a type of action to take on a breakpoint, a type code indicates a type of breakpoint and a count code indicates a number of address matches to ignore.

17. The integrated circuit of claim 16, wherein the actions corresponding to said action code are selected from the group consisting of begin a trace, end a trace, generate a debug event, pulse a trap signal and disable.

18. The integrated circuit of claim 16, wherein the types corresponding to said type code are selected from the group consisting of text fetch, data read, data write and data read or write.

19. The integrated circuit of claim 1, wherein said MD block is a hardware development system (HDS) block.

20. A method for decoding and executing instructions marked with breakpoint codes in a digital processor, said digital processor including a processor core for processing instructions input to said processor wherein said processor core includes a fetch circuit having a prefetch queue and a decode stage, said processor further including a matching detection (MD) block coupled to said processor core and an address bus of said digital processor, said method comprising the steps of:

storing a breakpoint condition to be matched on said address bus in a breakpoint register, said breakpoint condition indicating a breakpoint action from one of a plurality of breakpoint actions;

returning a breakpoint code indicative of a breakpoint number of said breakpoint register to said prefetch queue when an address on said address bus matches said breakpoint condition, said breakpoint code marking an instruction associated with said address on said address bus;

decoding said instruction and said breakpoint code when said instruction reaches said decode stage; and providing a signal to said MD block when an instruction marked with said breakpoint code is to be decoded, said signal indicative of which said breakpoint register holds said breakpoint condition associated with the breakpoint code marking said instruction.

21. The method of claim 20, further including the step of providing a breakpoint enable signal to said processor core, said breakpoint enable signal indicative of whether a break event is enabled for said instruction marked with said breakpoint code to be executed.

22. The method of claim 20, further including the step of generating trigger events upon decoding of a breakpoint instruction.

23. The method of claim 22, wherein said MD block further includes breakpoint counters corresponding to said breakpoint registers, further including the step of updating one of said breakpoint counters upon occurrence of one of said trigger events.

24. The method of claim 22, wherein said MD block further includes an on-chip trace buffer, said trace buffer being adapted to begin or end a trace based on occurrence of one of said trigger events.

25. The method of claim 22, wherein said MD block is coupled to an external trap pin, said MD block being adapted to pulse said external trap upon occurrence of one of said trigger events.

26. The method of claim 20, wherein a data bus is coupled to said processor core and said MD block, further including the step of matching a data value on said data bus with said breakpoint condition stored in said at least one breakpoint register.

27. The method of claim 20, wherein a control bus is coupled to said processor core and said MD block, further including the step of matching a value on said control bus with said breakpoint condition stored in said at least one breakpoint register.

28. A digital processor device adapted to decode and execute instructions marked with breakpoint codes, said device comprising:
   a processor core for processing instructions input to said processor, said processor core including a fetch circuit and a decode circuit, said fetch circuit including a prefetch queue;
   a matching detection (MD) block coupled to said processor core, and being further coupled to an address bus of said digital processor, said MD block including:
      at least one breakpoint register for storing a breakpoint condition to be matched on said address bus, said breakpoint condition indicating a breakpoint action from one of a plurality of breakpoint actions;
      said MD block operable to return a breakpoint code indicative of a breakpoint number of said at least one breakpoint register to said fetch circuit when an address on said address bus matches said breakpoint condition;
   said breakpoint code marking an instruction associated with said address on said address bus, wherein said instruction and said breakpoint code are decoded when said instruction reaches said decode circuit; and
   wherein said processor core is operable to provide a signal to said MD block when an instruction marked with said breakpoint code is to be decoded, said signal indicative of which of said at least one breakpoint register holds said breakpoint condition associated with the breakpoint code marking said instruction.

29. The device of claim 28, wherein said MD block is further operable to provide a breakpoint enable signal to said processor core, said breakpoint enable signal indicative of whether a break event is enabled for said instruction marked with said breakpoint code to be executed.

30. The device of claim 28, wherein said breakpoint condition to be matched is selected from the group consisting of address, subset of address and address range.

31. The device of claim 28, wherein said MD block is adapted to generate trigger events upon decoding of a breakpoint instruction.

32. The device of claim 2, wherein said MD block is a hardware development system (HDS) block.

* * * * *